United States Patent [19]
Mules

[11] Patent Number: 5,785,849
[45] Date of Patent: Jul. 28, 1998

[54] CENTRIFUGAL FILTER

[76] Inventor: Robert S. Mules, 11 Woodfiled Rd., Talbot, Green Mid Glamorgan CF7 8JF, United Kingdom

[21] Appl. No.: 868,664

[22] Filed: Jun. 4, 1997

[30] Foreign Application Priority Data

Jun. 10, 1996 [GB] United Kingdom ............... 9612102

[51] Int. Cl.$^6$ ............... B04B 3/00; B04B 9/06; B01D 36/00
[52] U.S. Cl. ............... 210/297; 210/307; 210/361.1; 210/320; 494/36; 494/49; 494/60; 494/84
[58] Field of Search ............... 210/360.1, 307, 210/295, 320, 297; 494/36, 49, 60, 84

[56] References Cited

U.S. PATENT DOCUMENTS

| | | |
|---|---|---|
| 4,106,689 | 8/1978 | Kozulla. |
| 4,284,504 | 8/1981 | Alexander. |
| 4,492,631 | 1/1985 | Martin. |
| 4,508,530 | 4/1985 | Schlegel. |

FOREIGN PATENT DOCUMENTS

| | | |
|---|---|---|
| 1131600 | 6/1962 | Germany. |
| 578110 | 10/1977 | Russian Federation. |

Primary Examiner—Thomas M. Lithgow

[57] ABSTRACT

A centrifugal oil filter in which a cylindrical housing 42 is rotatable by the reaction force from oil jets 56 leaving via nozzles 44, is increased by the provision of ribs 54 on the inner wall surface of the cylindrical housing 28. This enables the cylindrical vessel 42 to be provided with an internal coarse oil filter while allowing an increase in acceleration and rotational speed.

13 Claims, 1 Drawing Sheet

CENTRIFUGAL FILTER

The present invention relates to a centrifugal oil filter.

Centrifugal oil filters are known wherein a rotatably mounted cylindrical vessel is enclosed within a housing, the vessel being provided with at least one oil outlet adapted to project an oil jet or jets substantially tangentially from the vessel, thereby to induce rotation of the vessel. This rotation has an effect on any solid particles in the oil, these solid particles being thrown outwardly and collecting on the inner surface of the wall of the vessel.

Examples of such an arrangement are shown in GB-A-2283694 and EP-A-0699826.

While these arrangements are reasonably satisfactory, it is an object of the present invention to provide improvements in such a centrifugal filter.

According to the present invention, there is provided a centrifugal oil filter comprising a cylindrical housing, a vessel rotatably mounted substantially coaxially within said housing, an oil inlet and an oil outlet to said housing, an oil inlet connection between the oil inlet and the interior of the rotatable vessel, at least one outlet nozzle on said vessel adapted to project an oil jet or jets substantially tangentially from said vessel, thereby to induce rotation of the vessel and at least one rib on the inner wall of the cylindrical housing positioned to be impacted by said jet or jets.

The provision of the rib or ribs on the inner wall of the cylindrical housing according to the invention, has been found to provide a greater reaction force on the vessel. As a result of this the acceleration of the vessel is increased and the rotational speed of the vessel is increased, thereby providing a better separating action.

Preferably the vessel is provided with two or more circumferentially spaced outlet nozzles and the inner wall of the housing is provided with a plurality of circumferentially spaced ribs.

While reference is made herein to the housing being cylindrical, it must be realised that this is not restricted merely to a right circular cylinder, but to the general meaning of a cylinder, namely that produced by a straight or curved line rotating about a fixed axis.

Preferably the oil inlet connection leads substantially to the centre of the rotational vessel and an annular oil filter is mounted within the vessel to remove particles from the oil, at least prior to the vessel achieving operational rotational speed. Because the reaction force produced by the provision of the ribs is increased as compared with conventional centrifugal oil filters, any loss of pressure in the annular oil filter will cause little or not problem. It will be appreciated that until the vessel gets up to rotational speed, there will be no centrifugal separation within the vessel and hence the provision of such an oil filter with this preferred structure of the invention can remove solid particles. The filter, of course, will need to be a coarse filter to ensure that the pressure drop there-across is not too great.

Advantageously the cylindrical housing includes a base having a central threaded bore to secure the base to a threaded spigot on an engine and one or more outlet ports to return filtered oil to the engine, a casing including an end wall and an annular side wall, cooperating means on the end of the side wall remote from the end wall for releasibly securing the casing to the base, a spindle coaxial with the threaded bore and mounted on the base and on the end wall, and bearing means associated with the spindle for mounting the vessel thereon for rotation.

Such a structure is compact and relatively inexpensive to manufacture. Other more conventional base castings could be used to mount directly to an engine, to support the filter unit in a vertical orientation.

BRIEF DESCRIPTION OF THE DRAWINGS

In order that the present invention may more readily be understood, the following description is given, merely by way of example, reference being made to the accompanying drawings in which.

Figure 1:
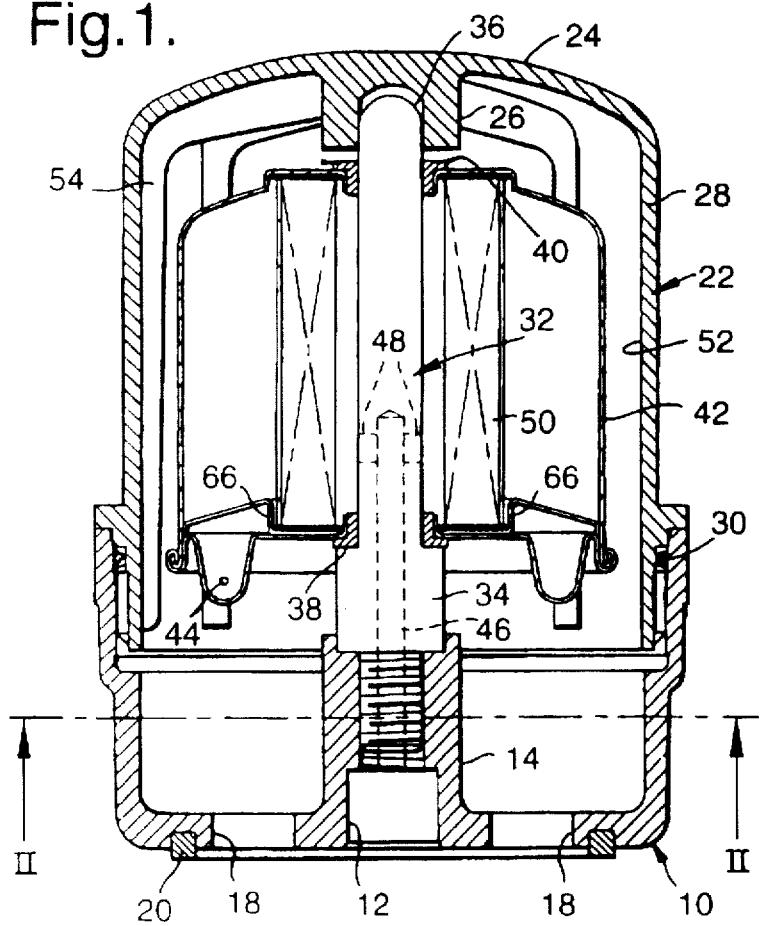
FIG. 1 is a side elevation, in section taken along the line I—I of FIG. 2.

If reference is first made to FIG. 1, the oil filter illustrated therein comprises a base 10, having a central internally threaded oil inlet bore 12 therein for securing to a threaded spindle on an engine, this bore being formed in a central post 14, of the base 10. The base 10 also has an upstanding cylindrical wall 16, while the base is also provided with two or more outlet ports 18, surrounded by a sealing gasket 20.

The base 10 forms the end of a housing indicated by the general reference numeral 22, this including an end wall 24, having a central spigot 26, and an annular side wall 28. A conventional connection is provided at the end of the annular side wall 28 remote from the end wall 24, and on the upper end of the wall 16 of the base for securing the base and the housing 22 releasibly with respect to one another. This can be in the form of a screw thread, a bayonet fitting or the like and a sealing O-ring 30 seals the two parts together.

Extending between the post 14 and the spigot 26 is a spindle 32 which has a thickened shoulder portion 34 engaged on the upper end of the post. The upper end of the spindle 32 is engaged in a hollowed out portion 36 of the spigot 26.

Mounted by means of lower and upper bearings 38,40 is a rotatable vessel 42, the base of which is provided with two diametrically opposite oil outlet nozzles 44.

The spindle 32 is hollow and thus provides an oil inlet connection 46 which opens, via ports 48, into the interior of the rotatable vessel 42. Within an inner portion of the vessel 42 is mounted an annular coarse filter element 50.

Figure 2:
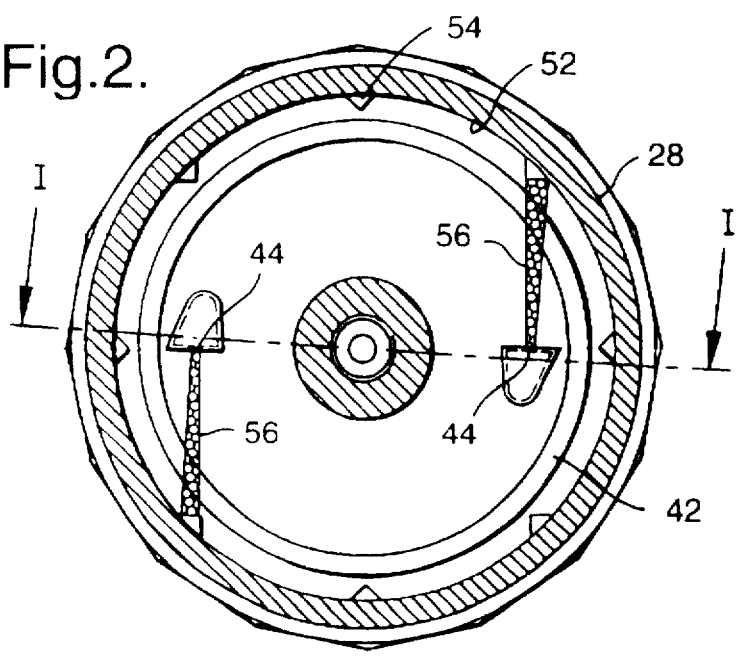
FIG. 2 is a section taken along the lines II—II of FIG. 1.

Formed on the inner wall surface 52 of the annular wall 28 are a number of axially extending ribs 54. FIG. 2 illustrates that there are eight such ribs, although any number could be used. Preferably these ribs are circumferentially equally spaced. It will be noted that the rib 54 extends substantially the full length of the wall 28, and indeed extends along the end wall 24 to the spigot 26. This will facilitate the moulding of the housing 22. In FIG. 2 the generally triangular cross-section of the ribs 54 is illustrated.

In use, oil is fed in via the bore 12, the oil inlet connection 46 and the ports 48 into the interior of the vessel 42. The oil passes through the coarse filter 50 and oil pressure will build up within the vessel whereupon oil leaves the vessel via holes 66 and will be projected from the nozzles 44 in jets 56 illustrated schematically in FIG. 2.

It has been found that the provision of the ribs 54 increases the reaction force thereby causing an increase both in the acceleration rate, to get the vessel 42 up to operational speed, and also increases the overall rotational speed. Even with the provision of the coarse filter 50 which will reduce the pressure appearing at nozzles 44, better acceleration and rotational speeds can be achieved.

I claim:

1. A centrifugal oil filter comprising a cylindrical housing, having an upstanding cylindrical wall, a vessel rotatably mounted substantially coaxially within said housing, an oil inlet and an oil outlet to said housing, an oil inlet connection between the oil inlet and the interior of the rotatable vessel, at least one outlet nozzle on said vessel adapted to project an oil jet or jets substantially tangentially from said vessel, thereby to induce a rotation of said vessel, the upstanding cylindrical wall extending below the jets and a plurality of circumferentially equally spaced parallel vertical ribs on the inner wall of the cylindrical housing said ribs each having a face positioned to be impacted by said jet or jets, said face extending substantially perpendicular to said jet or jets.

2. An oil filter as claimed in claim 1, wherein the vessel is provided with two or more circumferentially equally spaced outlet nozzles.

3. An oil filter as claimed in claim 1, wherein the oil inlet connection leads substantially to the centre of the vessel and further comprising an annular oil filter mounted within the vessel effective to remove particles from the oil at least prior to the vessel achieving operational rotational speed.

4. An oil filter as claimed in claim 1, wherein the cylindrical housing comprises a base, a central threaded bore formed in said base, effective to secure the base to a threaded spigot on an engine and one or more outlet ports formed in said base, effective to return filtered oil to the engine, a casing including an end wall and an annular side wall, cooperating means on the end of the side wall remote from the end wall for releasibly securing the casing to the base, a spindle coaxial with the threaded bore and mounted on the base and on the end wall, and bearing means operatively associated with the spindle for mounting the vessel thereon for rotation.

5. An oil filter as claimed in claim 4, wherein the oil inlet connection passes through said spindle.

6. A centrifugal oil filter comprising a cylindrical base, a central threaded bore formed in said base, effective to secure the base to a threaded spigot on an engine and one or more outlet ports formed in said base, effective to return filtered oil to the engine, a casing including an end wall and an annular upstanding cylindrical side wall, cooperating means on the end of the side wall remote from the end wall for releasibly securing the casing to the base, a spindle coaxial with the threaded bore and mounted on the base, and on the end wall, bearing means operatively associated with the spindle, a vessel rotatably mounted substantially coaxially with said vessel on said-bearing means, an oil inlet connection between said oil inlet and the interior of the rotatable vessel, at least one outlet nozzle on said vessel adapted to project an oil jet or jets substantially tangentially from said vessel, thereby to induce rotation of the vessel, the upstanding cylindrical wall extending below the jets and a plurality of circumferentially equally spaced parallel vertical ribs on the inner wall of the cylindrical housing, said ribs each having a face positioned to be impacted by said jet or jets, said face extending substantially perpendicular to said jet or jets.

7. An oil filter as claimed in claim 6, wherein the vessel is provided with two or more circumferentially equally spaced outlet nozzles.

8. An oil filter as claimed in claim 6, wherein the oil inlet connection leads substantially to the center of the vessel, and further comprising an annular oil filter mounted within the vessel effective to remove particles from the oil at least prior to the vessel achieving operational rotation speed.

9. An oil filter as claimed in claim 6, wherein the oil inlet connection passes through said spindle.

10. An oil filter as claimed in claim 4, wherein each rib extends substantially the full length of the inner wall of the casing.

11. An oil filter as claimed in claim 10, wherein the ribs extend along the end wall of the casing.

12. An oil filter as claimed in claim 6, wherein each rib extends substantially the full length of the inner wall of the casing.

13. An oil filter as claimed in claim 6, wherein the ribs extend along the end wall of the casing.

* * * * *